United States Patent
Li et al.

(10) Patent No.: US 10,127,605 B2
(45) Date of Patent: Nov. 13, 2018

(54) METHOD AND SERVER FOR PROCESSING ITEM IDENTIFIERS, AND COMPUTER READABLE STORAGE MEDIUM

(71) Applicant: BEIJING JINGDONG SHANGKE INFORMATION TECHNOLOGY CO, LTD, Beijing (CN)

(72) Inventors: Ziwei Li, Shenzhen (CN); Huiqi Xie, Shenzhen (CN); Lisong Xiao, Shenzhen (CN); Zihe Pan, Shenzhen (CN); Geng Tian, Shenzhen (CN); Di Liu, Shenzhen (CN)

(73) Assignee: BEIJING JINGDONG SHANGKE INFORMATION TECHNOLOGY CO, Beijing (CN)

( * ) Notice: Subject to any disclaimer, the term of this patent is extended or adjusted under 35 U.S.C. 154(b) by 0 days.

(21) Appl. No.: 14/698,704

(22) Filed: Apr. 28, 2015

(65) Prior Publication Data

US 2015/0242939 A1   Aug. 27, 2015

Related U.S. Application Data

(63) Continuation of application No. PCT/CN2013/085645, filed on Oct. 22, 2013.

(30) Foreign Application Priority Data

Nov. 15, 2012   (CN) .......................... 2012 1 0458679

(51) Int. Cl.
*G06Q 30/00* (2012.01)
*G06Q 30/06* (2012.01)
*G06F 17/30* (2006.01)

(52) U.S. Cl.
CPC ... *G06Q 30/0641* (2013.01); *G06F 17/30876* (2013.01); *G06Q 30/0601* (2013.01)

(58) Field of Classification Search
CPC ....... G06Q 30/0631; G06Q 30/0601–30/0645; G06Q 30/06–30/08; G06F 17/30864; G06F 17/3089
(Continued)

(56) References Cited

U.S. PATENT DOCUMENTS

| | | | |
|---|---|---|---|
| 6,064,980 A | * | 5/2000 | Jacobi ................. G06Q 30/06 705/1.1 |
| 7,398,461 B1 | | 7/2008 | Broder et al. |

(Continued)

FOREIGN PATENT DOCUMENTS

CN   102542474 A   7/2012

OTHER PUBLICATIONS

International Search Report and Written Opinion dated Jan. 30, 2014, for International Patent App. No. PCT/CN2013/085645, filed Oct. 22, 2013.

*Primary Examiner* — Ethan D Civan
(74) *Attorney, Agent, or Firm* — Stoel Rives, LLP; John Thompson

(57) ABSTRACT

A method and server for processing item identifiers and a computer readable storage medium are disclosed. In one aspect, the method includes obtaining item transform information of the item identifiers and calculating item transform scores of the item identifiers based on the corresponding item transform information. The method also includes sorting the item identifiers according to the item transform scores of the item identifiers. The method further includes providing the sorted item identifiers to a display terminal.

13 Claims, 3 Drawing Sheets

(58) Field of Classification Search
USPC .............................................. 705/26.1–27.2
See application file for complete search history.

(56) References Cited

U.S. PATENT DOCUMENTS

| | | | |
|---|---|---|---|
| 7,698,170 B1* | 4/2010 | Darr .................. | G06Q 30/0609 |
| | | | 705/26.35 |
| 2004/0117276 A1* | 6/2004 | Kettler, III ......... | G06Q 10/0875 |
| | | | 705/29 |
| 2005/0038819 A1* | 2/2005 | Hicken ............. | G06F 17/30743 |
| 2007/0235465 A1* | 10/2007 | Walker ................ | G06Q 10/087 |
| | | | 221/9 |
| 2009/0006398 A1* | 1/2009 | Lam ....................... | G06Q 30/02 |
| 2009/0271293 A1* | 10/2009 | Parkhurst ............... | G06Q 30/02 |
| | | | 705/26.1 |
| 2010/0250336 A1* | 9/2010 | Selinger ................ | G06Q 30/02 |
| | | | 705/26.7 |
| 2012/0143883 A1* | 6/2012 | Chen .................. | G06F 17/3089 |
| | | | 707/751 |

* cited by examiner

METHOD AND SERVER FOR PROCESSING ITEM IDENTIFIERS, AND COMPUTER READABLE STORAGE MEDIUM

INCORPORATION BY REFERENCE TO RELATED APPLICATIONS

This application is a continuation of International Application No. PCT/CN2013/085645, filed Oct. 22, 2013, which claims the benefit under 35 U.S.C. § 119 of Chinese Patent Application No. 201210458679.X, filed on Nov. 15, 2012, which are hereby incorporated by reference in their entirety.

BACKGROUND

Field

The described technology generally relates to Internet technologies, and particularly relates to a method for processing item identifiers and a server.

Description of the Related Art

With the continuous development of e-commerce, the requirements of users for e-commerce is gradually increasing. For example, a user may want to know about information of products having better sales or higher concerns.

At present, item identifiers shown on a product display page of a display terminal (such as a personal computer (PC)) may generally be organized and managed based on product recommended locations and store demands. A service provide may edit and manage the item identifiers shown on the product display page, such as adjust the arrangement of products according to an inventory, or remove a product out off a shelf.

However, there are some problems for managing the item identifiers shown on the product display page.

Firstly, various commands for editing the products are input manually, and the information concerning the products may be static.

Secondly, the item identifiers shown on the product display page may generally be obtained from a product pool. After the service provider adds an item identifier into the product pool, it or he cannot timely get information regarding the clicks and sales of the item identifier on the display terminal.

SUMMARY OF CERTAIN INVENTIVE EMBODIMENTS

One inventive aspect is a method for processing item identifiers. The method includes: obtaining item transform information of the item identifiers; calculating item transform scores of the item identifiers based on the corresponding item transform information; sorting the item identifiers according to the item transform scores of the item identifiers; and providing the sorted item identifiers to a display terminal.

Another aspect is a server which includes: memory, and one or more processors; the memory stores one or more program modules configured for execution by the one or more processors; wherein the one or more program modules comprise: an item transform information obtaining module, to obtain item transform information of item identifiers; an item transform score calculating module, to calculate item transform scores of the item identifiers based on the corresponding item transform information; a sorting module, to sort the item identifiers according to the item transform scores of the item identifiers; and a transmitting module, to transmit the sorted item identifiers to a display terminal.

BRIEF DESCRIPTION OF THE DRAWINGS

For a better understanding of the present disclosure, reference should be made to the Detailed Description below, in conjunction with the following drawings in which like reference numerals refer to corresponding parts throughout the figures.

DETAILED DESCRIPTION OF THE CERTAIN INVENTIVE EMBODIMENTS

Reference will now be made in detail to examples, which are illustrated in the accompanying drawings. In the following detailed description, numerous specific details are set forth in order to provide a thorough understanding of the present disclosure. Also, the figures are illustrations of examples, in which modules or procedures shown in the figures are not necessarily essential for implementing the present disclosure. In other instances, well-known methods, procedures, components, and/or circuits have not been described in detail so as not to unnecessarily obscure aspects of the examples.

Figure 1:
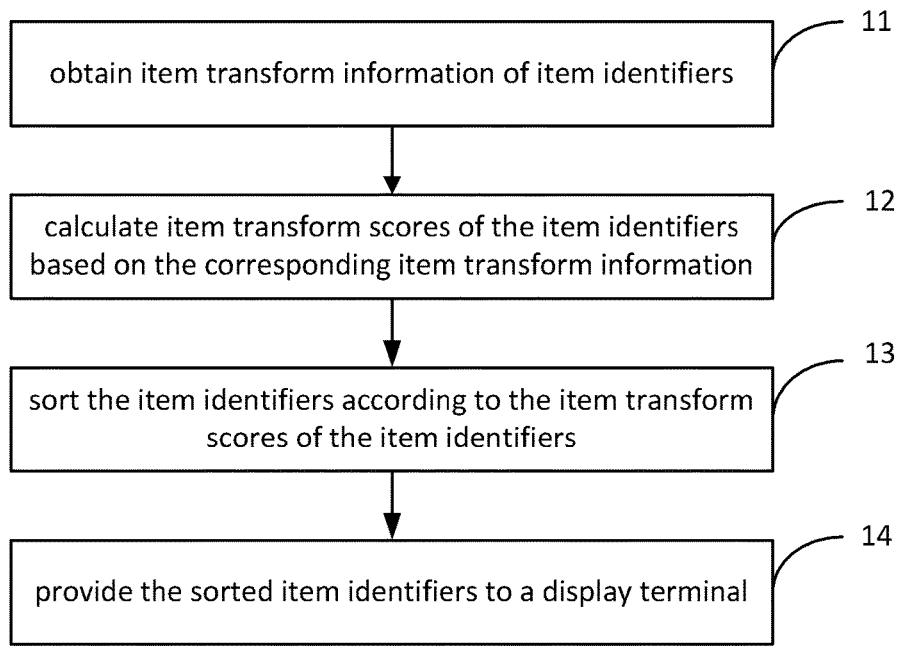
FIG. 1 is a flow diagram illustrating a method of processing item identifiers according to an example of the present disclosure.

In an example, a method for processing item identifiers is provided in FIG. 1. Specifically, the method includes: obtaining item transform information of the item identifiers (block 11); calculating item transform scores of the item identifiers based on the corresponding item transform information (block 12); sorting the item identifiers according to the item transform scores of the item identifiers (block 13); and providing the sorted item identifiers to a display terminal (block 14).

In this way, the item transform information reflecting display effect of the item identifiers may be obtained timely. Accordingly, display positions of the item identifiers on the display terminal may be adjusted automatically according to the corresponding item transform information, thus providing a uniform frequency of appearance for the item identifiers.

Figure 2:
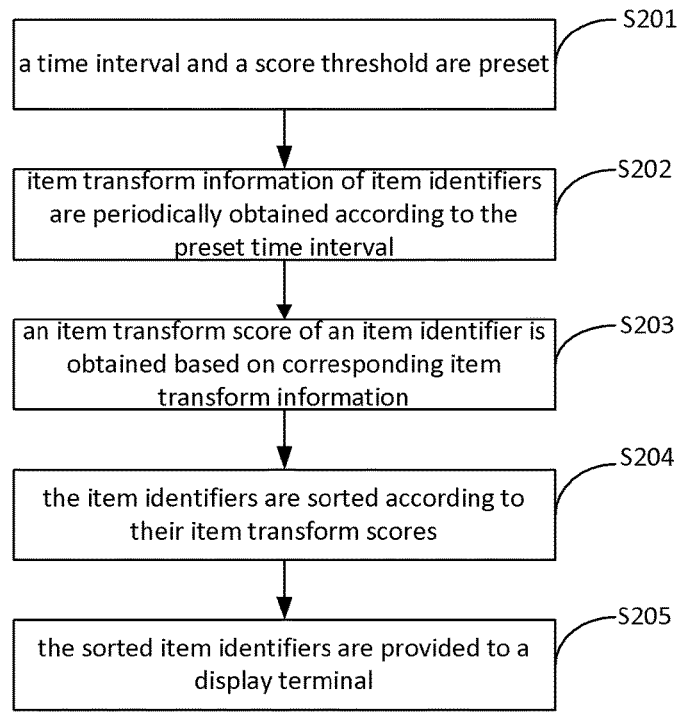
FIG. 2 is a flow diagram illustrating a method of processing item identifiers according to an example of the present disclosure.

Further, a method of processing item identifiers may be illustrated in FIG. 2 according to an example of the present disclosure. In an example, the method may be implemented by a server. Specifically, the server may be a computing device including a processor and a memory.

At block S201, a time interval T and a score threshold Q are preset. In an example, the time interval T is 30 minutes, and the score of the score threshold Q is 10 points.

In an example, an off-shelf rate M is further configured and used together with the score threshold Q to control the item identifiers to be taken out off the shelf (e.g., deleted from the page). Specifically, one or more item identifiers may be selected according to the off-shelf rate M from the item identifiers having an item transform score lower than the score threshold. Then, the selected one or more item identifiers are identified as candidate item identifiers.

For example, it is supposed that there are 40 item identifiers on the page. When the score of the score threshold Q is 5 and the off-shelf rate M is 10%, there may be 10 item identifiers having an item transform score lower than the score threshold Q, and one item identifier may finally be deleted from the page. For another example, when the score of the score threshold Q is 9 and the off-shelf rate M is 15%, there may be 18 item identifiers having an item transform score lower than the score threshold Q, and 3 item identifiers may finally be deleted from the page. The off-shelf rate M can be used to balance the item identifiers preserved in a product pool and those shown on the page. When the number of the item identifiers left in the product pool is less than the number of item identifiers having an item transform score lower than the score threshold Q, the off-shelf rate M is employed to prevent a waste of display positions on the page. That is, a part of the item identifiers having a lower item transform score are deleted from the page and replaced by the item identifiers randomly selected from the product pool, while the other part of the item identifiers having a lower item transform score remain on the page.

At block S202, item transform information of item identifiers displayed on a page are periodically obtained according to the preset time interval T. In an example, the item identifiers are identifiers shown on a display of a terminal for presenting corresponding products. By way of example, an item identifier may be a merchandise identifier displayed on an online shopping webpage (e.g., wanggou.com, taobao-.com). The item identifier may be shown in a variety of forms, such as in animation, in a picture form, or in a text form.

In an example, the item transform information of the item identifiers may be obtained once every 30 minutes. The item transform information of an item identifier may, for example, include at least one of the following parameters including: the number of page views (PV) of the item identifier, the number of unique visitors (UV) of the item identifier, the number of orders of the item identifier, the number of confirmed orders of the item identifier, sales volume of the item identifier, sales amount of the item identifier, a real-time conversion rate of the item identifier, and an overall conversion rate of the item identifier. In this way, clicks and sales of products may be monitored in realtime, and the inventory of the products can further be synchronized.

In an example, the number of PVs of the item identifier may be the number of times the item identifier has been clicked, and the number of UVs of the item identifier may be the number of people that click on the item identifier. The number of orders of the item identifier may be the number of times the item identifier has been ordered, and the number of confirmed orders may be the number of orders receiving payments and being approved. The sales volume may be the quantity or number of products sold in a specified period, and the sales amount may be the amount of money corresponding to the products sold. The real-time conversion rate of the item identifier may be a ratio of the number of orders of the item identifier to the number of PVs of the item identifier, and the overall conversion rate of the item identifier may be a ratio of the number of confirmed orders of the item identifier to the number of PVs of the item identifier.

At block S203, an item transform score of an item identifier may be obtained based on corresponding item transform information.

Specifically, block S203 may include: calculating a score for each parameter of the item transform information, and calculating the item transform score corresponding to the item identifier according to the respective scores of the parameters and corresponding proportions of the parameters.

In an example, a first score is generated for the number of PVs of an item identifier. That is, a server may calculate statistics on clicks of the item identifier received on its display position to get the number of PVs of the item identifier within the time interval T, and generate the first score based on the number of PVs. For example, if the item identifier was clicked 10 times within 30 minutes, the corresponding first score may be 10 points.

In an example, a second score is generated for the number of orders of an item identifier. That is, a server may calculate statistics to record how many orders the item identifier receives within the time interval T in order to get the number of orders of the item identifier, and generate the second score based on the number of orders. For example, if a score per order is 5 points and there are 10 orders within 30 minutes, the corresponding second score may be 50 points.

Accordingly, a third score, a fourth score, . . . , and an N-th score corresponding to other parameters included in the item transform information such as the sales amount of an item identifier, the number of UVs of the item identifier, the real conversion rate of the item identifier are respectively generated. Specifically, N is a natural number. Finally, the item transform score of the item identifier may be generated according to the first, second, . . . , and N-th scores of the item identifier.

In an example, the proportion of each parameter of the item identifier may be taken into account during the calculation of the item transform score of the item identifier. Thus, item identifiers may be sorted based on focus of users. For example, when the users have a higher concern on the sales amount of the item identifier, the proportion of the third score corresponding to the sales amount of the item identifier included in the item transform information is set to 50%, while the proportion of the second score corresponding to the sales volume of the item identifier included in the item transform information is set to 30%. In this way, the third score corresponding to the sales amount of the item identifier may have a higher proportion than other scores, thereby enabling item identifiers to be sorted accurately to show item identifiers with a higher amount of sales. Thus, item identifiers with better sales or higher concerns may be displayed on a better position of a page intelligently. On the other hand, products with poor sales may also have a balanced appearance rate.

At block S204, the item identifiers are arranged in a prescribed sequence. That is, the item identifiers are sorted according to their item transform scores.

At block S205, the sorted item identifiers are provided to the display terminal, in order to be displayed on a webpage in a sorted order on the display terminal. In an example, the item identifiers are displayed on a screen of the display terminal. Specifically, the display terminal may show the item identifiers in the sorted order on a webpage of an application currently run on the display terminal.

In an example, an item identifier having a higher score is arranged in a better position for display, e.g., on the top of a page. On the contrary, an item identifier having a lower score is arranged in other positions for display, e.g., on the bottom of the page. As such, the item identifier having the higher score may have more chances to display, showing that the product indicated by the item identifier tends to be a quality product popular to users.

In an example, an item transform score of an item identifier may be compared with the score threshold Q. When the item transform score of the item identifier is lower than the score threshold Q, the item identifier may be identified as a candidate item identifier (i.e., a wait-to-display item identifier). For example, in the case that the item transform score of the item identifier is 8 while the score threshold is 10, the item identifier is identified as the candidate item identifier since its item transform score is lower than the score threshold Q. In an example, candidate item identifiers are preserved in the product pool, waiting for opportunities to be displayed on the page. After an item identifier displayed on the page is identified as a candidate item identifier, it is deleted from the page (i.e., taken out off the shelf) and stored into the product pool.

It is noted that the score threshold Q may be related to an off-shelf rate M. For example, there is a positive correlation between the score threshold Q and the off-shelf rate M. In an example, the score threshold Q is set in the present disclosure for determining which item identifiers are to be taken out off the shelf with relatively lower item transform scores, while the number of item identifiers taken out off the shelf is further determined according to the off-shelf rate M. As such, it is possible to take advantage of real-time control logic to alternate item identifiers currently displayed on the page with those contained in the product pool.

Moreover, an item identifier with abnormal information may be identified as a candidate item identifier. For example, identifiers of out of stock items, or identifiers of items with quality problem feedbacks are identified as the candidate item identifiers. When an item identifier with abnormal information is labeled the candidate item identifier, another item identifier within the product pool is selected, and filled to the display position of the item identifier with abnormal information, to avoid a waste of display positions.

In an example, in order to ensure that candidate item identifiers have more possibility to be displayed on the page, item transform scores of item identifiers displayed on the page may be set to an initial score when item identifier replacement occurs. Then, the server enters into a new loop for collecting item transform information and calculating item transform scores, and all the item identifiers to be displayed on the page may start from the initial score. In an example, the initial score may be 0. It is supposed that item identifiers A, B and C are shown on the page at first, and item identifier A has an item transform score lower than the score threshold Q. Then, item identifier A is replaced by item identifier D previously stored in the product pool. After the item identifier replacement, item identifiers B, C and D are now shown on the page. At this time, item transform scores of item identifiers B, C and D are reset to zero, thereby providing item identifier D a fair chance to compete with item identifiers B and C.

In this way, the method provided in such as FIGS. 1-2 may obtain product related information from a page of a display terminal in realtime, and automatically adjust display positions of item identifiers in accordance with the product related information, to provide a uniform frequency of appearance for all kinds of merchandise.

Figure 3:
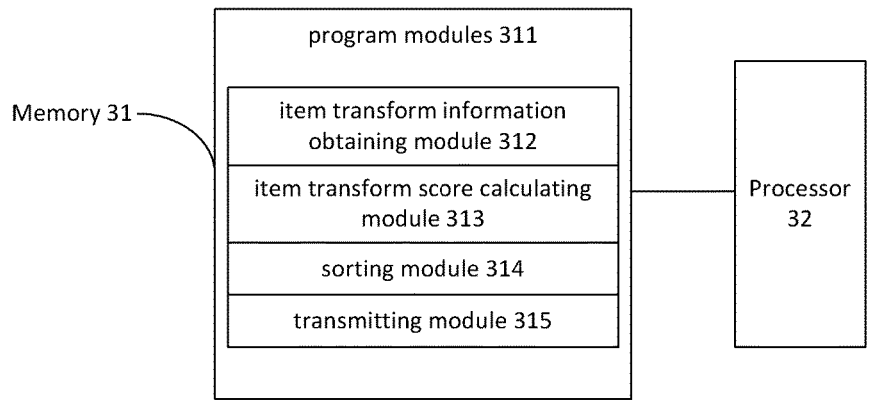
FIG. 3 is a schematic diagram illustrating a structure of a server according to an example of the present disclosure.

A structure of a server may be illustrated in FIG. 3 according to an example of the present disclosure. Specifically, the server may include memory 31, and one or more processors 32. The memory 31 stores one or more program modules 311 configured for execution by the one or more processors 32. In an example, the one or more program modules 311 include: an item transform information obtaining module 312, an item transform score calculating module 313, a sorting module 314, and a transmitting module 315.

Specifically, the item transform information obtaining module 312 is configured to obtain item transform information of item identifiers. The item transform score calculating module 313 is configured to calculate item transform scores of the item identifiers based on the corresponding item transform information. The sorting module 314 is configured to sort the item identifiers according to the item transform scores of the item identifiers. The transmitting module 315 is configured to transmit the sorted item identifiers to a display terminal.

Therefore, the present disclosure provides a server configured to timely obtain item transform information reflecting display effect of item identifiers shown on a display terminal. Accordingly, display positions of the item identifiers may be adjusted automatically according to the corresponding item transform information, thus providing a uniform frequency of appearance for the item identifiers.

Figure 4:
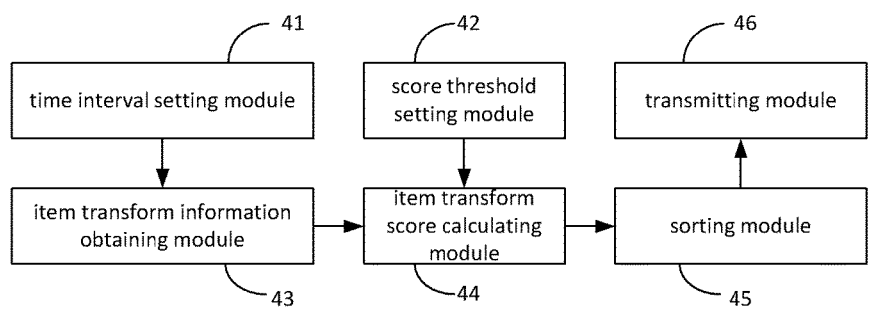
FIG. 4 is a schematic diagram illustrating a structure of a server according to an example of the present disclosure.

FIG. 4 is a schematic diagram illustrating a structure of a server according to an example of the present disclosure. Specifically, the server includes a time interval setting module 41, a score threshold setting module 42, an item transform information obtaining module 43, an item transform score calculating module 44, a sorting module 45, and a transmitting module 46.

In an example, the time interval setting module 41 is configured to preset a time interval T, and the score threshold setting module 42 is configured to preset a score threshold Q. The operations of the two modules may refer to such as descriptions relating to FIGS. 1-3, which are not described repeatedly hereinafter.

In an example, the item transform information obtaining module 43 is configured to obtain the item transform information of the item identifiers periodically according to the time interval T. The item transform score calculating module 44 is configured to calculate item transform scores of the item identifiers based on the corresponding item transform information, and acquire the score threshold Q set by the score threshold setting module 42. The sorting module 45 is configured to sort the item identifiers according to the item transform scores of the item identifiers. The transmitting module 46 is configured to transmit the sorted item identifiers to a display terminal to enable the display terminal to show the sorted item identifiers on a page.

In an example, the sorting module 45 is further configured to determine whether the item transform score of an item identifier is lower than the score threshold Q, and identify the item identifier as a candidate item identifier if the item transform score is lower than the score threshold Q.

Figure 5:
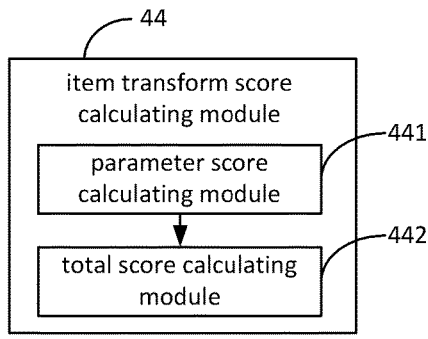
FIG. 5 is a schematic diagram illustrating a structure of an item transform score generating module within the server illustrated in FIG. 4 according to an example of the present disclosure.

FIG. 5 is a schematic diagram illustrating a structure of an item transform score generating module 44 according to an example of the present disclosure.

Specifically, the item transform score calculating module 44 includes: a parameter score calculating module 441 and a total score calculating module 442.

In an example, the parameter score calculating module 441 is configured to calculate a score of each parameter contained in the item transform information. The total score calculating module 442 is configured to calculate an item transform score of an item identifier according to the scores of the parameters contained in the item transform information of the item identifier and proportions of the corresponding parameters.

The operations of the modules contained in the server may refer to such as descriptions relating to FIGS. 1-4, which are not described repeatedly hereinafter.

Figure 6:
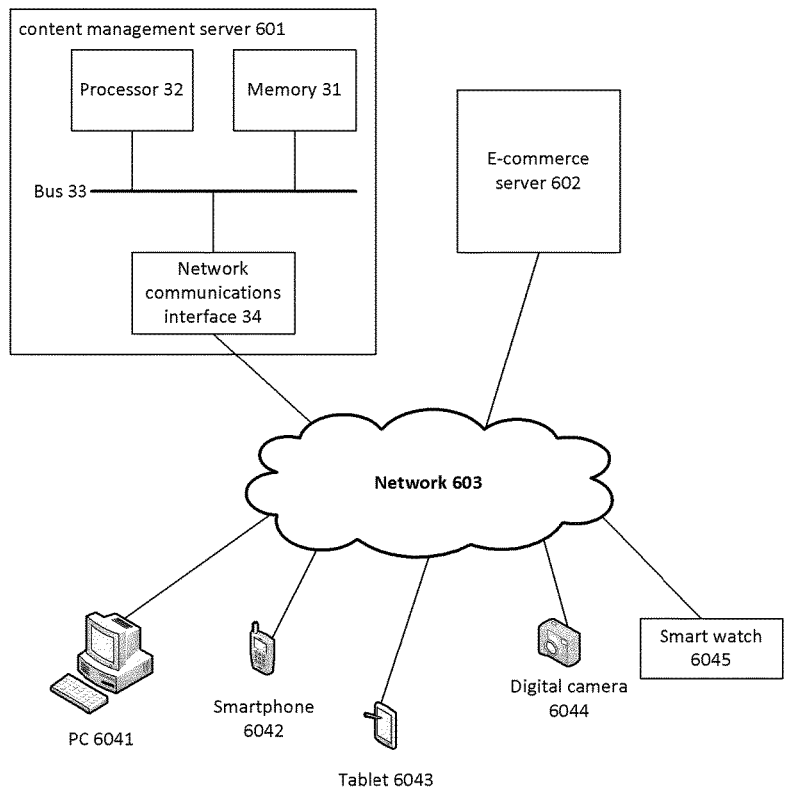
FIG. 6 illustrates a system for supporting e-commerce according to an example of the present disclosure.

In a scenario, the server illustrated in such as FIGS. 3-5 may be employed as a content management backend of an electronic commerce company to adjust products or services on a webpage. FIG. 6 illustrates a system for supporting e-commerce according to an example of the present disclosure. The system includes a content management server 601, an e-commerce server 602, and a network 603. The content management server 601 is illustrated in such as FIGS. 3-5, which includes a memory 31, a processor 32, a bus 33 that couples various components of the content management server 601 including the memory 31 to the processor 32, and a network communications interface 34. The network communications interface 34 connects the content management server 601 to the network 603, which may be such as the Internet or an Intranet. The e-commerce server 602 is configured to provide a website for buying and selling products or services, wherein the website may include a plurality of webpages. Users may access the website via the network 603 by use of various terminal devices 604 such as a PC 6041, a smartphone 6042, a tablet 6043, a digital camera 6044, a smart watch 6045, or an electronic device having the ability to access a webpage. In this way, item identifiers managed by the content management server 601 displayed on a page maintained by the e-commerce server 602 may be presented on a screen of the terminal device 604 as illustrated in such as FIGS. 1-5.

Figure 7:
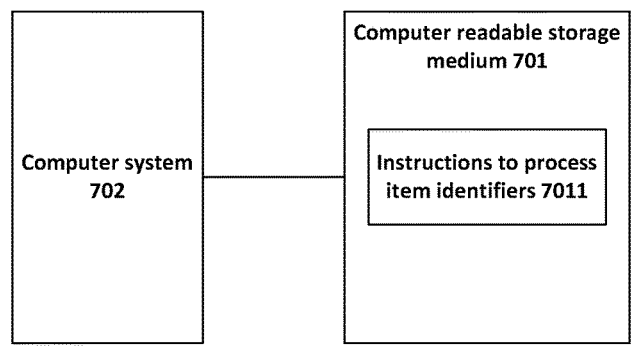
FIG. 7 illustrates a computer readable storage medium executed by a computer system.

FIG. 7 illustrates a computer readable storage medium 701 storing one or more programs configured to be executed by a computer system 702.

In an example, the one or more programs include instructions 7011 configured to: obtain item transform information of item identifiers; calculate item transform scores of the item identifiers based on the corresponding item transform information; sort the item identifiers according to the item transform scores of the item identifiers; and transmit the sorted item identifiers to a display terminal.

In an example, the one or more programs include instructions 7011 configured to: preset a time interval; and obtain the item transform information of the item identifiers periodically according to the time interval.

In an example, the one or more programs include instructions 7011 configured to: preset a score threshold; determine whether the item transform score of an item identifier is lower than the score threshold; and identify the item identifier as a candidate item identifier if the item transform score is lower than the score threshold.

In an example, the one or more programs include instructions 7011 configured to: calculate a score of each parameter contained in the item transform information; and calculate an item transform score of an item identifier according to the scores of the parameters contained in the item transform information of the item identifier and proportions of the corresponding parameters.

Specifically, the instructions 7011 configured to process item identifiers may refer to such as FIGS. 1-6, which may not be described in detail repeatedly.

In view of the above, the present disclosure may timely acquire item transform information of an item identifier representing a product from a page of the display terminal, generate an item transform score corresponding to the item identifier according to the item transform information, and automatically adjust the display position of the item identifier based on the item transform score. The item transform information may be, for example, the number of page views (PV) of the item identifier, or sales volume of the item identifier. As such, item identifiers may be displayed on a page by turns, i.e., the item identifiers may have a substantially uniform frequency of appearance in order to avoid the Matthew effect. In other words, item identifiers already shown in the page can be avoided from being always displayed on the page while item identifiers not shown in the page (candidates in the product pool) never have a chance to appear on the page.

The foregoing description, for purpose of explanation, has been described with reference to specific examples. However, the illustrative discussions above are not intended to be exhaustive or to limit the present disclosure to the precise forms disclosed. Many modifications and variations are possible in view of the above teachings. The examples were chosen and described in order to best explain the principles of the present disclosure and its practical applications, to thereby enable others skilled in the art to best utilize the present disclosure and various examples with various modifications as are suited to the particular use contemplated.

The above examples may be implemented by hardware, software, firmware, or a combination thereof. For example the various methods, processes and functional modules described herein may be implemented by a processor (the term processor is to be interpreted broadly to include a central processing unit (CPU), processing unit/module, application-specific integrated circuit (ASIC), logic module, or programmable gate array, etc.). The processes, methods and functional modules may all be performed by a single processor or split between several processors; reference in this disclosure or the claims to a 'processor' should thus be interpreted to mean 'one or more processors'. The processes, methods and functional modules are implemented as machine readable instructions executable by one or more processors, hardware logic circuitry of the one or more processors or a combination thereof. The modules, if mentioned in the aforesaid examples, may be combined into one module or further divided into a plurality of sub-modules. Further, the examples disclosed herein may be implemented in the form of a software product. The computer software product is stored in a non-transitory storage medium/device and comprises a plurality of instructions for making an electronic device implement the method recited in the examples of the present disclosure.

What is claimed is:

1. A computer-implemented method for intelligently adjusting positions of item identifiers displayed on a webpage of an application running on a display terminal, the item identifiers transmitted over a data communication network for display on the display terminal, comprising:
processing a request, from the display terminal, for the webpage including the item identifiers;
obtaining item transform information for each of the item identifiers displayed on the webpage, the item transform information for each of the item identifiers comprising of website product parameters comprising stored values indicating website monitored store demands associated with the item identifiers;
calculating a plurality of item transform scores, each score corresponding to the item identifier displayed on the webpage and based at least in part on the item transform information, the calculating of the item transform scores comprising:

generating scores of the website product parameters contained in the item transform information;

calculating the item transform score for each of the item identifiers based at least in part on the scores of the web site product parameters contained in the item transform information of the corresponding item identifier and proportions of the corresponding parameters; and sorting the item identifiers according to the item transform scores to form ordered item identifiers;

presetting an item transform score threshold, wherein, determining whether the item transform score of the item identifier is lower than the item transform score threshold;

removing the item identifier having the item transform score lower than the item transform score threshold from the ordered item identifiers;

identifying the item identifier having the item transform score lower than the item transform score threshold as a candidate item identifier; and adding the item identifier identified as the candidate item identifier into a product pool;

transmitting, over the data communication network, a response to the display terminal that includes the sorted item identifiers on the webpage; and wherein, if the item identifier displayed on the webpage is identified as the candidate item identifier, selecting the candidate item identifiers from the product pool to be displayed on the webpage, and setting the item transform scores of the item identifiers currently displayed on the webpage and the candidate item identifiers selected from the product pool to be an initial score, so as to recalculate the corresponding item transform scores and rearrange the ordered item identifiers on the webpage based at least in part on the recalculated item transform score.

2. The method of claim 1, further comprising:
presetting a time interval; and
obtaining the item transform information of the item identifiers periodically according to the time interval.

3. The method of claim 1, wherein identifying the item identifier as the candidate item identifier comprises:
setting an off-shelf rate;
selecting, according to the off-shelf rate, one or more item identifiers from the item identifiers having an item transform score lower than the score threshold; and
identifying the selected one or more item identifiers as the candidate item identifiers.

4. The method of claim 1, wherein each of the item transform scores comprises a sum of each of the scores of the parameters respectively multiplied by the proportions of the corresponding parameters.

5. The method of claim 1, further comprising calculating the proportions of the parameters based on concerns of a user of the display terminal for the corresponding parameters.

6. The method of claim 1, wherein the website product parameters comprises at least two parameters of the following parameters representing website monitored store demands associated with the item identifiers: the number of page views of the item identifier, the number of orders of the item identifier, sales volume of the item identifier, sales amount of the item identifier, the number of unique visitors of the item identifier, the number of confirmed orders of the item identifier, a real-time conversion rate of the item identifier, and an overall conversion rate of the item identifier.

7. The method of claim 1, further comprising identifying an item identifier with abnormal information, selecting another item identifier from the product pool, and filling a display position of the item identifier with abnormal information with the another item identifier.

8. A server for intelligently adjusting positions of item identifiers displayed on a webpage of an application running on a display terminal, the item identifiers transmitted over a data communication network for display on the display terminal, comprising:
a memory; and
one or more processors;
wherein the memory has stored thereon instructions which, when executed, cause the one or more processors to:
process a request, from the display terminal, for the webpage including the item identifiers;
obtain item transform information for each of a plurality of item identifiers displayed on the webpage, the item transform information for each of the item identifiers comprising website product parameters comprising stored values indicating website monitored store demands associated with the item identifiers;
calculate a plurality of item transform scores respectively, each score corresponding to the item identifier displayed on the webpage and based at least in part on the item transform information, the calculating of the item transform scores comprising:
generate scores of the web site product parameters contained in the item transform information;
calculate the item transform score for each of the item identifiers based at least in part on the scores of the website product parameters contained in the item transform information of the corresponding item identifier and proportions of the corresponding parameters; and
sort the item identifiers according to the item transform scores to form ordered item identifiers;
preset an item transform score threshold, wherein,
determine whether the item transform score of the item identifier is lower than the item transform score threshold;
remove the item identifier having the item transform score glower than the score threshold from the ordered item identifiers;
identify the item identifier having the item transform score lower than the item transform score threshold as a candidate item identifier; and
add the item identifier identified as the candidate item identifier into a product pool;
transmit, over the data communication network, a response to the display terminal that includes the sorted item identifiers on the webpage;
wherein, if the item identifier displayed on the webpage is identified as the candidate item identifier,
selecting the candidate item identifiers from the product pool to be displayed on the webpage, and
setting the item transform scores of the item identifiers currently displayed on the webpage and the candidate item identifiers selected from the product pool to be an initial score, so as to recalculate the corresponding item transform scores and rearrange the ordered item identifiers on the webpage based at least in part on the recalculated item transform score.

9. The server of claim 8, wherein the memory further has instructions stored thereon which, when executed, cause the one or more processors to:
  preset a time interval; and
  obtain the item transform information of the item identifiers periodically according to the time interval.

10. The server according to claim 8, wherein the memory has stored thereon further instructions which, when executed, cause the one or more processors to:
  identify an item identifier with abnormal information pool, select another item identifier from the product pool, and fill a display position of the item identifier with abnormal information with the another item identifier.

11. A non-transitory computer readable storage medium having stored thereon one or more programs configured to be executed by a computer system, the one or more programs comprising instructions configured to cause the computer system to:
  process a request, from a display terminal, for a webpage of an application running on a display terminal including item identifiers;
  obtain item transform information for each of a plurality of item identifiers displayed on the webpage, the item transform information for each of the item identifiers comprising website product parameters associated with the item identifiers;
  calculate a plurality of item transform scores, each score corresponding to the item identifiers displayed on the webpage and based at least in part on the item transform information, the calculating of the item transform scores comprising:
    generating scores of the web site product parameters contained in the item transform information;
    calculating the item transform score for each of the item identifiers based at least in part on the scores of the website product parameters contained in the item transform information of the corresponding item identifier and proportions of the corresponding parameters;
  sort the item identifiers according to the item transform scores to form ordered item identifiers;
  preset an item transform score threshold, wherein,
    determine whether the item transform score of the item identifier is lower than the item transform score threshold;
    remove the item identifier having the item transform score lower than the item transform score threshold from the ordered item identifiers;
    identify the item identifier having the item transform score lower than the item transform score threshold as a candidate item identifier; and
    add the item identifier identified as the candidate item identifier into a product pool;
  transmit, over the data communication network, a response to the display terminal that includes the sorted item identifiers on the webpage; and
  wherein, if the item identifier displayed on the webpage is identified as the candidate item identifier,
    select the candidate item identifiers from the product pool to be displayed on the webpage, and
    set the item transform scores of the item identifiers currently displayed on the webpage and the candidate item identifiers selected from the product pool to be an initial score, so as to recalculate the corresponding item transform scores and rearrange the ordered item identifiers on the webpage based at least in part on the recalculated item transform score.

12. The non-transitory computer readable storage medium of claim 11, wherein the one or more programs include instructions configured to cause the computer system to:
  preset a time interval; and
  obtain the item transform information of the item identifiers periodically according to the time interval.

13. The non-transitory computer readable storage medium according to claim 11, further comprising instructions configured to cause the computer system to:
  identify an item identifier with abnormal information, select another item identifier from the product pool, and fill a display position of the item identifier with abnormal information with the another item identifier.

* * * * *